United States Patent [19]

Kerby

[11] Patent Number: 4,837,652
[45] Date of Patent: Jun. 6, 1989

[54] METHOD AND APPARATUS FOR INDEXING AND LABELING ELECTRONIC DISKS

[76] Inventor: Thomas D. Kerby, 68 E. Kensington Ave., Salt Lake City, Utah 84115

[21] Appl. No.: 60,411

[22] Filed: Jun. 11, 1987

[51] Int. Cl.$^4$ ............................................. G11B 23/03
[52] U.S. Cl. .................................................... 360/133
[58] Field of Search ....................... 364/900, 401, 405; 360/133, 99, 128, 15, 92; 206/444

[56] References Cited

U.S. PATENT DOCUMENTS 4,695,911  9/1987  Loosen ................................. 360/133
4,724,501  2/1988  Buchwald et al. ................... 360/133

Primary Examiner—Thomas M. Heckler
Assistant Examiner—John Mills
Attorney, Agent, or Firm—Marcus G. Theodore

[57] ABSTRACT

A method and apparatus for indexing and labeling electronic disks comprised of providing an open or transparent window covering a segment of the jacket of the disk having an opening into which a removable indexing label with a full or partial listing of the files stored on said disk may be placed.

7 Claims, 9 Drawing Sheets

METHOD AND APPARATUS FOR INDEXING AND LABELING ELECTRONIC DISKS

BACKGROUND

1. Field

This invention relates to filing indexing systems. More particularly, it relates to an electronic filing system for organizing and indexing electronic files stored on electronic disks utilizing an improved label with removable inserts.

2. State of the Art

Various electronic disk indexing and labeling systems are known. Electronic disks come in a variety of styles and shapes and serve as electronic storage medium for computers. Three popular disk styles are: floppy disks which are approximately 5¼ inch square, rigid disks which are approximately 3½ inches square, and Bernoulli cartridges which are much larger rigid square disks. All of these disks have outside jackets covering their interior electronic storage surfaces, and will hereafter be collectively referred to as disks.

Present disk labeling systems typically use adhesive backed paper labels for attachment to the electronic disk outside jacket. A generic name or a list of the contents of the files stored on the disk is then printed on the adhesive label. Because the file content of disks are frequently changed, deleted, or added to by users, there is a need to constantly change and update the label names or listings. Old labels can only be erased and modified so many times before they must also be replaced by a new adhesive label. Thus, conventional adhesive labeling systems require that the label listings either be scratched through, erased and modified, or a new label affixed to the disk on top of the old label. Frequently, the old adhesive labels must first be removed to prevent the thickness of multiple labels from interfering with the computer electronic disk ejection system. These adhesive labels are often times difficult to remove, and leave an adhesive and paper buildup, if the label is removed too many times.

The adhesive type index labels also have a tendency for their edges to lift as the adhesive bond breaks down through use. Those adhesive labels which wrap around the edge of a three inch electronic disk partially covering the front and back faces of the disk are particularly susceptible for their edges to lift and become unfastened. The sticky loosened edges of these labels have a tendency to adhere to the eject mechanisms in many computers causing jamming.

Where the files contents are frequently changed, or added to, listings on conventional adhesive labels cannot be organized in a desirable alphabetical, numerical, or other sortable sequence without extensive modification of the label every time a file is added or removed. Consequently, files are generally listed on adhesive labels in the order added to the disk. This last in/last listed labeling system is not always desirable for a user manually reviewing the contents of the disk. Where a large number of files are stored on the disk, extensive time is required to go through the entire contents of the file. If a generic name is simply listed on the label, the user has no way of reviewing the contents of the files without the delay of first inserting the disk into the computer for electronic review of the disk file contents.

There thus remains a need for an electronic labeling and indexing system which eliminates the above limitations of conventional adhesive labeling and indexing systems. Applicant's method and apparatus for indexing and labeling electronic disks described below provides such a system.

SUMMARY OF THE INVENTION

Applicant's invention comprises: providing the outside jacket surface of an electronic disk with a built in open or an attached transparent window having opening(s) into which a removable label may be placed; printing a removable label with the disk file contents in the sequential order desired by a user; and inserting the label within the window. For disks with numerous files, an additional index insert may be printed and inserted into a second window or sleeve associated with the disk window. The label thus serves as a disk identifying device, and the insert (whenever required) serves as an additional more complete index of the files on the disk. The preferred window is a clear cover with an opening into which a label or insert is placed. The window protects and allows the user to view labels and inserts associated with the disks.

In one embodiment of applicant's invention, the computer disk outside jacket may include built in framing structure defining an open window with an opening into which a removable label may be inserted. This is accomplished by structuring the edge of the disk with an open slot with a longitudinal groove sized to accommodate a removable label. Preferably the groove is sized to maintain a friction fit with the label to prevent it from falling out when the disk is in use. A window opening in either or both of the front and rear faces of the disk jacket is in communication with the groove to expose the printed surface of the label when inserted in the window. This window opening may be covered with a transparent window pane.

However, the preferred embodiment of applicant's invention is an attachable transparent window which comprises a transparent film window pane sized to fit within and cover a desired segment of the outside jacket of the disk. The film may be made of any transparent material such as a flexible plastic, resin, etc. The size of the window is dependent upon the size of the index lists anticipated to be printed on the label insert. It is envisioned that the label and transparent windows will thus come in a variety of sizes to suit a user's needs.

The preferred segment of the outside electronic disk jacket for a window to be located is the segment proximate the exposed edge of each disk when stored vertically in a filing cabinet. The labels, when stored in this position, can be readily reviewed in sequence. A user can easily flip through a number of stored disks and read the labels.

An adhesive coating is affixed along the perimeter edges on one side of the transparent window pane to bond it to the disk. One perimeter edge of the window pane has no adhesive to allow a removable label to be inserted through the non-bonded opening thus created. This preferred embodiment enables existing conventional disks to be adapted for use with removable labels or inserts, without modifying the structure of the disks themselves.

Prior to use, the transparent windows are adapted for storage. During storage, the transparent window panes usually include a removable backing covering the adhesive. This backing is then removed prior to use. Another method of storage stacks a plurality of transparent window panes on top of one another to self adhere as a pad. This allows the transparent window panes to be selectively separated and removed as needed. The inserts and labels may be separately stored, or packed in a kit with the transparent window panes.

These transparent windows may be colored or patterned to code electronic disks for manual indexing by project, clients, or files, as described below. The edge of the transparent window pane along the opening may be notched to accommodate the tip of a finger or fingernail to aid in the removal of the label inserts.

An imprintable removable label sized to fit within the transparent window is then inserted into the window opening. This removable label is marked with an appropriate name for the disk or contains a full or partial listing of the contents of the disk.

In one preferred embodiment, the removable label is imprinted with a sequential listing of all or a portion of the files stored on the disk. The listing may be alphabetical, numerical, by date when the file was prepared, by size of the file, or by some other category. The imprinting is accomplished by reading all file names from a disk or disks into a computer, selectively sorting the file names by disk criteria, sequencing and indexing the disk file names in the desired sequence, and printing the label with the index of disk file names. As files are updated, new files added to or old files deleted from the electronic disks, a new label is printed, the old label insert removed and discarded, and the new label insert placed within the transparent window.

Where the electronic disks, such as the Bernoulli cartridges, store a large number of files, it is desirable in addition to having the disk labeled, to have a complete index of all files also associated with the disk. An index insert may be printed, folded, and inserted into a second storage window or sleeve associated with the transparent window. In one preferred embodiment, a first window is attached to a sleeve structured as a protective storage envelope with an opening into which the entire electronic disk is inserted. A second window with an opening is attached on top of the first window. A printed label with a generic name or category listing of the disk is inserted into the first window. A printed insert with a sequential index of all the files on the disk is then inserted into the second window.

To aid a user in manually organizing the electronic disks, both the labels and transparent windows may be color coded or patterned to aid in storage. For example, all disks relating to a particular project may be color coded with a specific colored transparent window. Alternatively, the labels for a particular project may be color coded with a desired color and inserted into a clear transparent window. Color coding the label is preferred, because it is easier to change the color of the labels than remove and change the window when the entire disk is erased and assigned for use with a different group of files.

Related project disks can all be stored together under a particular assigned color. Where a user stores a large number of disks, color coding aids in preventing the mis-filing of disks. For example, sequential files may be stored by number groups, with each successive group assigned a different color. If a disk is mis-filed within a number group, the wrong color will show up within a grouping. The disks can then be quickly spot sorted and corrected to insure that files are always replaced within the correct grouping.

DESCRIPTION OF THE ILLUSTRATED EMBODIMENTS

Figure 1:
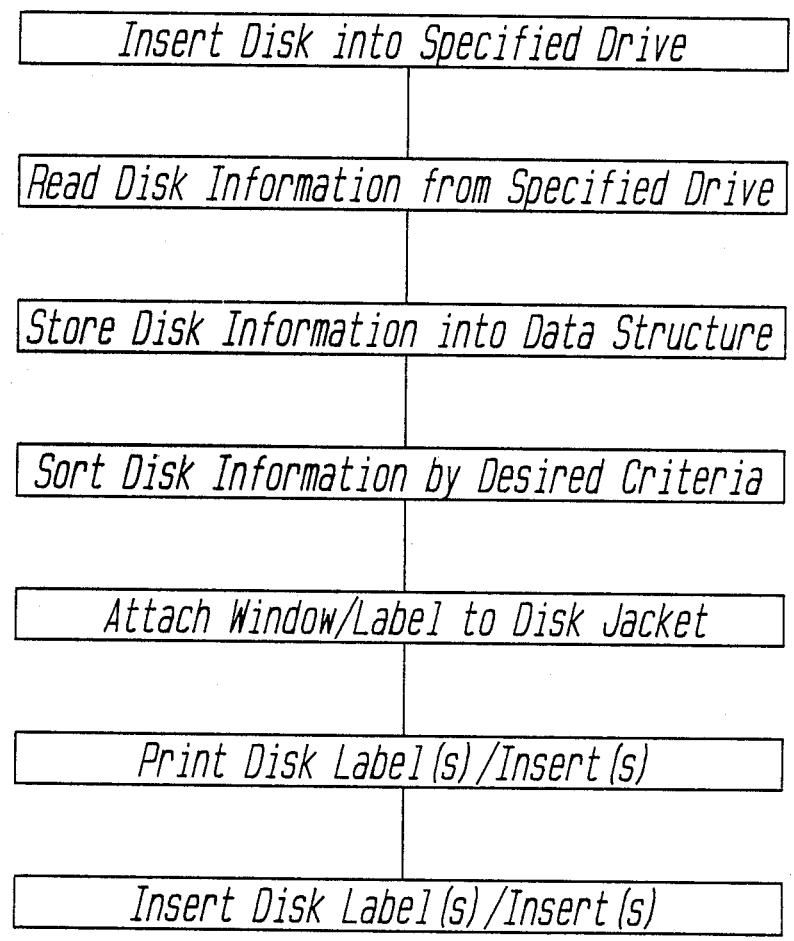
FIG. 1 illustrates a flow diagram of applicant's method.

FIG. 1 illustrates the flow diagram of applicant's method. An electronic disk is inserted into a specified drive. The names of all files on the disk is read by a computer. The names of the files are then stored into a data structure. The file names are then sorted and indexed by desired criteria. The electronic disk is adapted with window attached to a segment of the outer jacket of an electronic disk. A label and/or index is then printed on a removable label insert. The imprinted removable label insert is then placed within the window.

Figure 2:
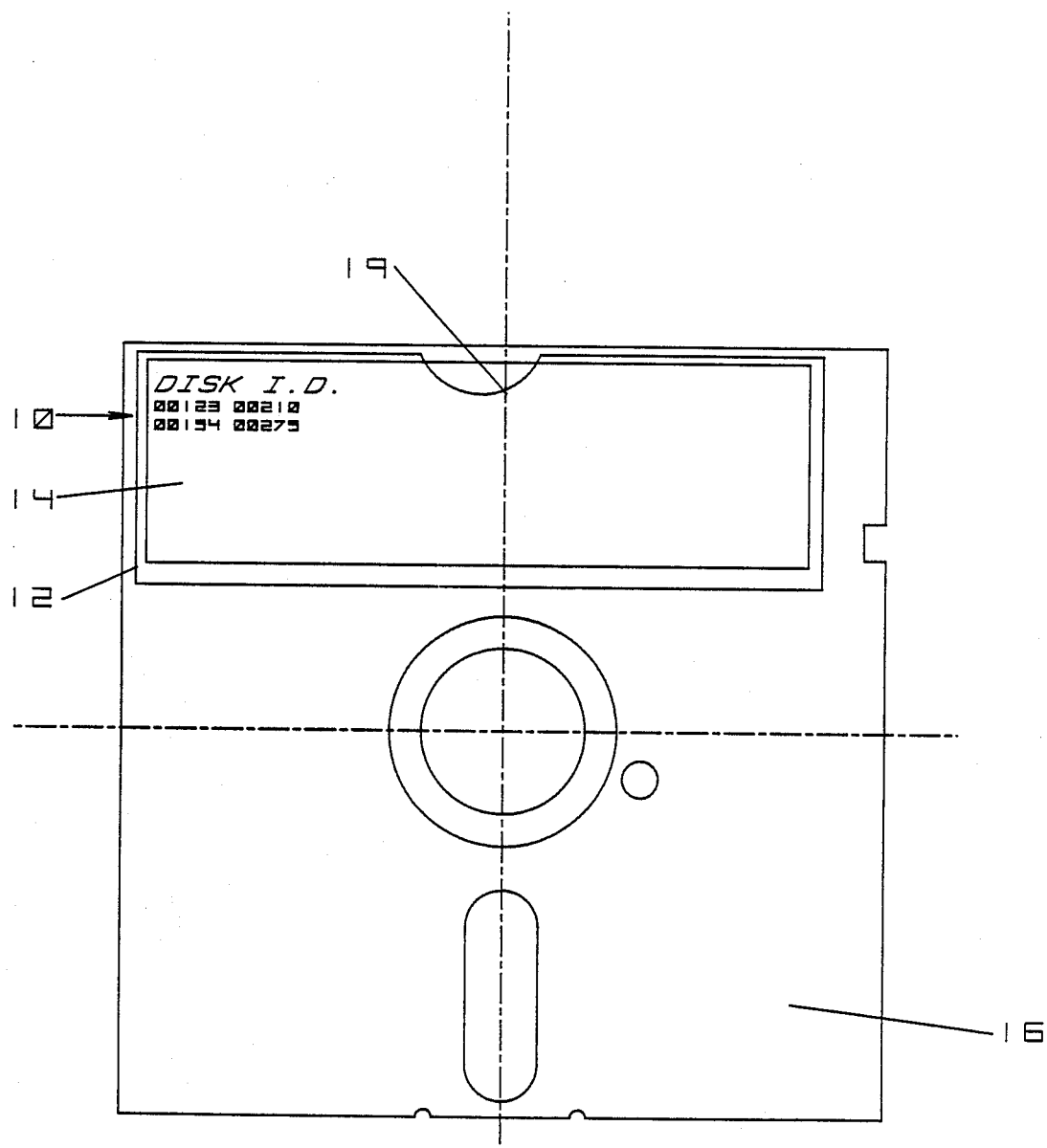
FIG. 2 illustrates one embodiment of applicant's invention.

FIG. 2 illustrates one embodiment of applicant's invention 10. The invention 10 comprises a transparent window pane 12 holding a removable label insert 14. The window pane 12 is adhesively bonded proximate the edge of the electronic disk 16 opposite the electrically activated segment of the disk 16 by a strip of adhesive (not shown) placed along three edges of the inside of the window pane 12. The window opening (not shown) parallels the vertical edge of the disk 16. The label insert 14 then inserted and removed via the window opening.

Figure 3:
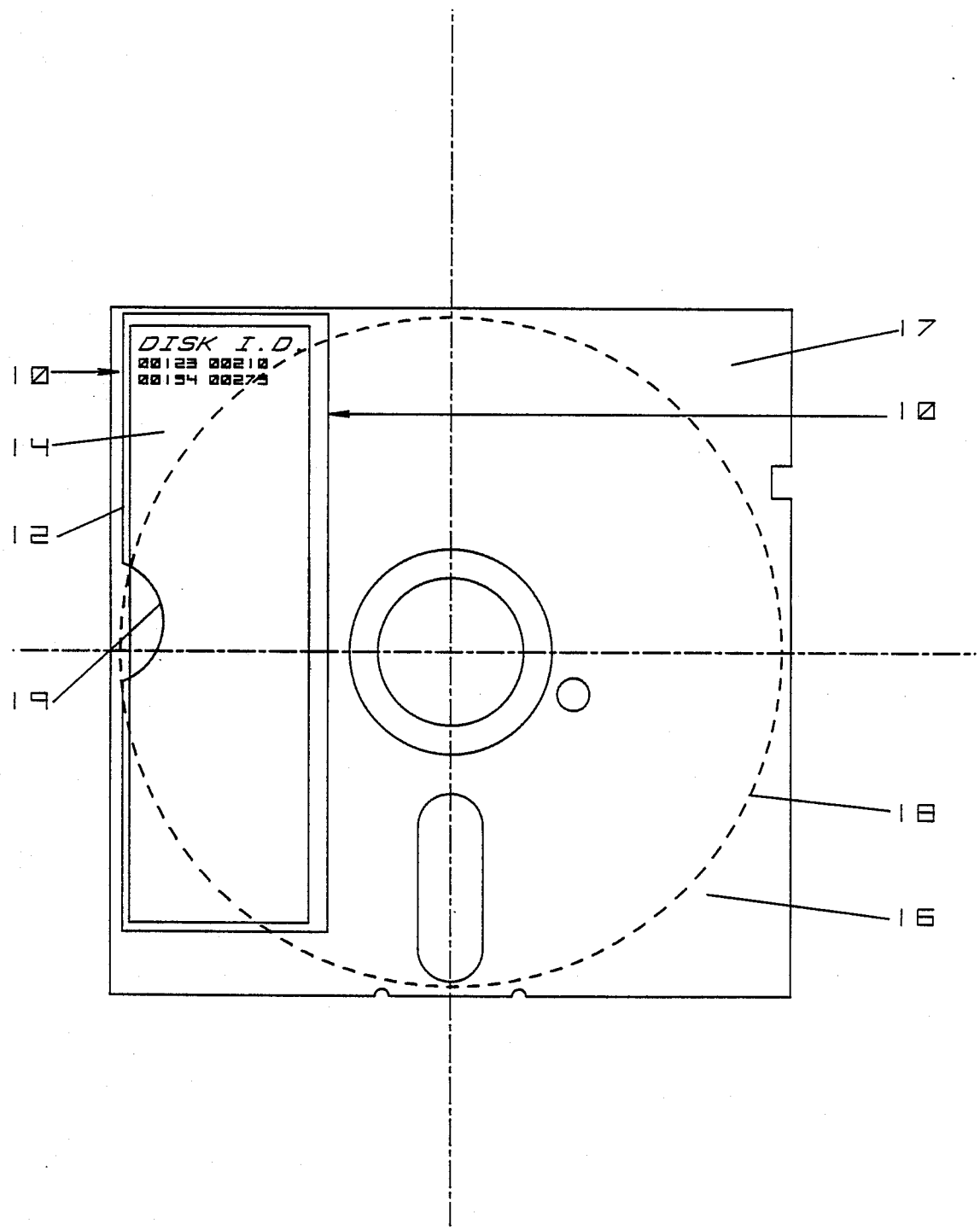
FIG. 3 is an alternate label location of the embodiment shown in FIG. 2.

FIG. 3 is a cross sectional view of the embodiment shown in FIG. 2 showing an alternative window label location. The outer jacket 17 of the disk 16 covers the circular electronic storage media 18 shown in dashed lines.

Figure 4:
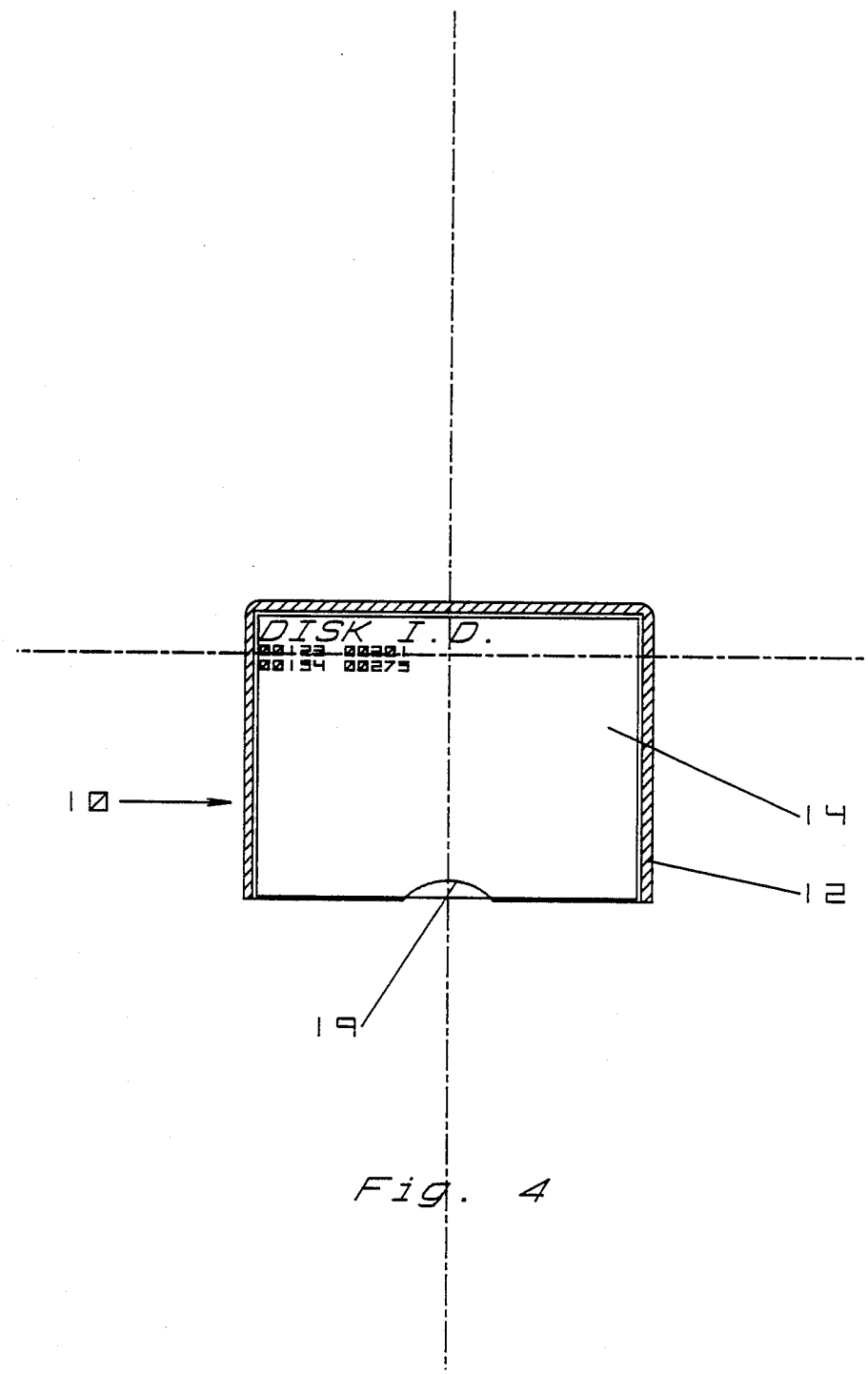
FIG. 4 illustrates the window and insert of applicant's invention.

FIG. 4 illustrates another embodiment of applicant's invention 10. The transparent window 12 has a strip of adhesive shown in hatch marks along three of its interior edges. The fourth edge has no adhesive to leave an opening through which a label insert 14 is inserted and removed. The fourth edge along the opening has a notch 19 sized to accommodate a finger or fingernail to aid in removing the label insert 14.

Figure 5:
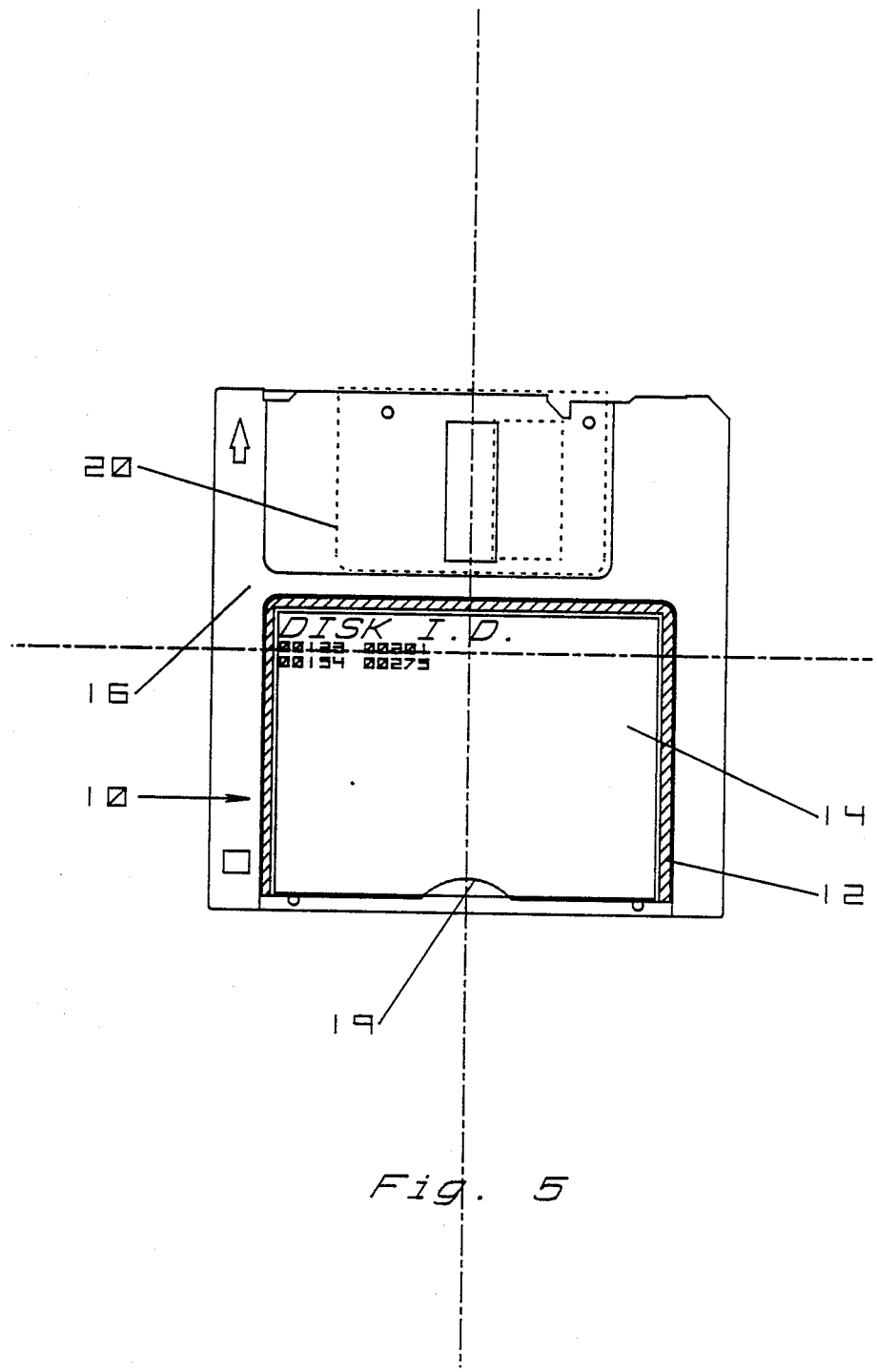
FIG. 5 illustrates the window and insert of applicant's invention attached to a rigid disk.

FIG. 5 shows the transparent window 12 illustrated in FIG. 4 attached to a three and a half by three and a half inch electronic disk 16 along the edge opposite the disk's metallic protective cover 20 of its electronic read section.

Figure 6:
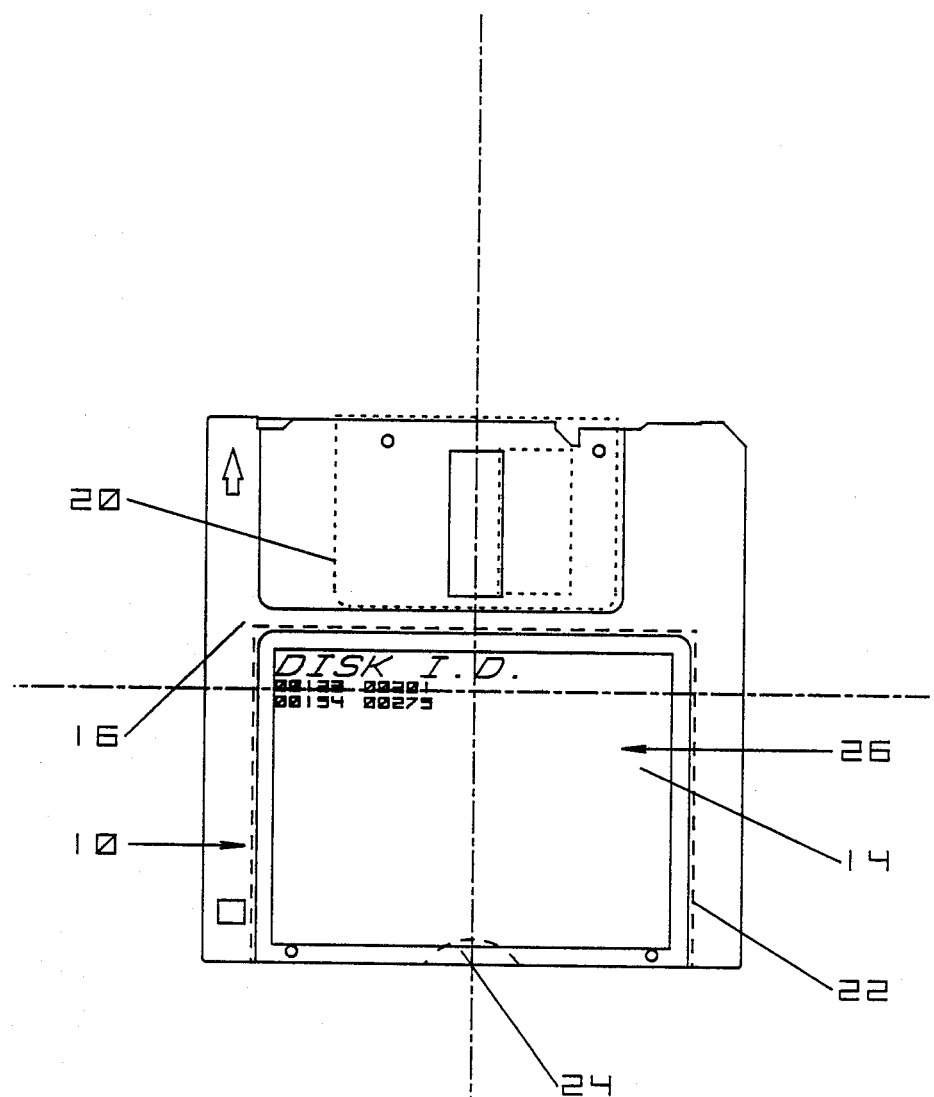
FIG. 6 illustrates another embodiment of applicant's invention.

FIG. 6 illustrates another embodiment of applicant's invention 10 where the outer disk jacket 16 defines an open window 26 with an opening into which a removable label 14 may be inserted. The open window 26 is structured as an internal slot 22 having an opening 24 along one of the edges of the disk jacket 16 into which a removable label insert 14 is inserted. The face of the disk jacket 16 has an open window 26 in communication with the internal slot 22 to expose the printing on the label 14 when inserted in the window 26.

Figure 7:
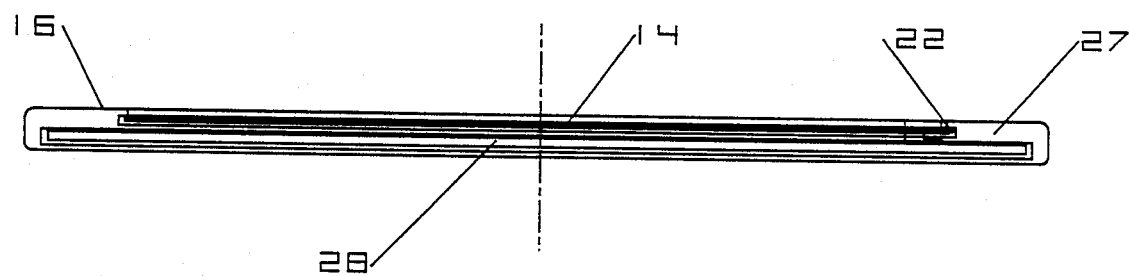
FIG. 7 is a top view of the embodiment shown in FIG. 6.

FIG. 7 is a top view of the embodiment shown in FIG. 6. The top edge 27 shows the internal slot 22 with a space surrounding the label insert 14. The slot 22 in the disk jack 16 lies above the circular electronic media disk 28. It is preferable that the slot 22 be sized to form a friction fit with the insert 14 to prevent said insert from accidentally falling out when in use. Friction bumps (not shown) may be placed along the slot 22 to provide sufficient hold on the insert 14 to prevent it from falling out.

Figure 8:
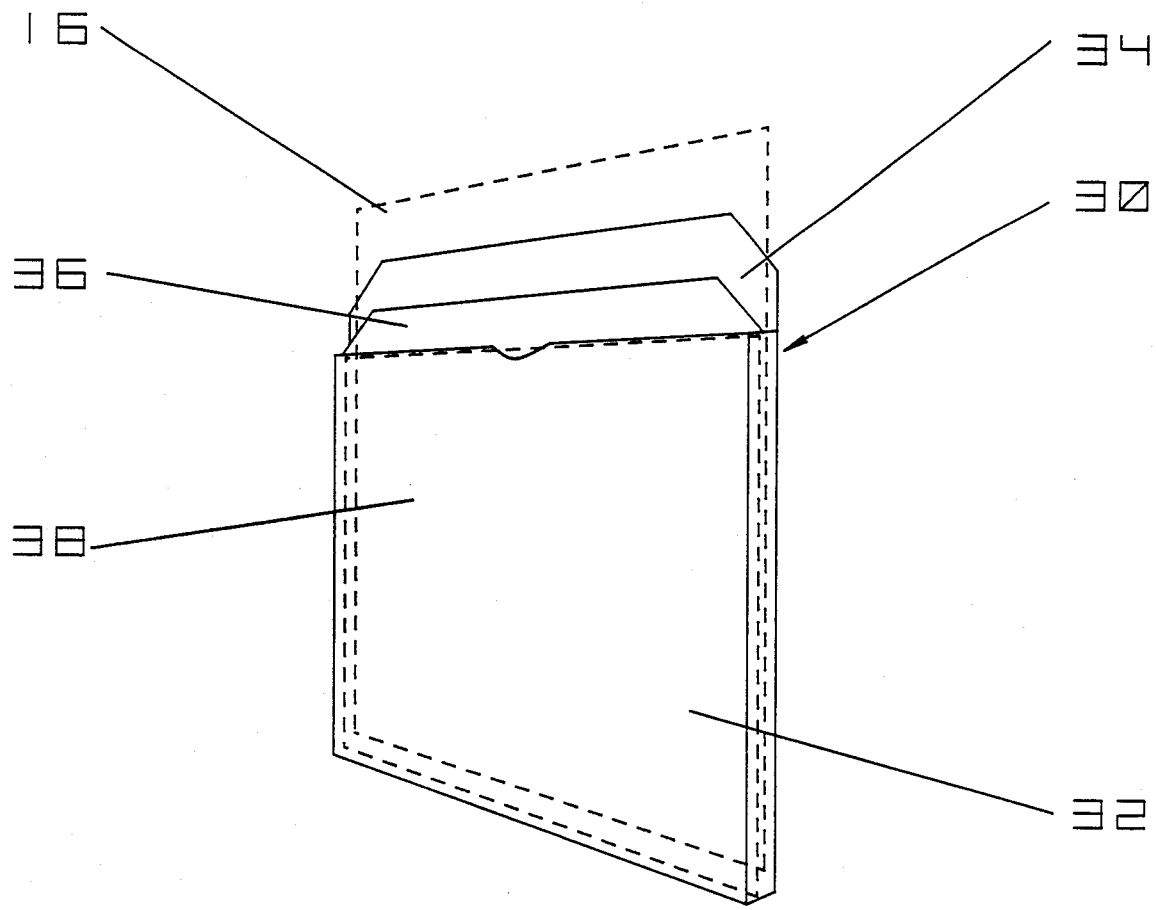
FIG. 8 illustrates another embodiment of applicant's invention.

FIG. 8 illustrates another preferred embodiment of applicant's storage window 10 structured as a sleeve 30 with a window 32, particularly suited for disk storage. The sleeve 30 is sized to accommodate the electronic disk and jacket 16, which is inserted into an opening 34 in the top of the sleeve 30. The window 32 is constructed of a transparent material and has an opening 36 into which a removable insert 38 with an index of the stored files on the associated disk is removably placed. The entire sleeve 30 may be constructed of a transparent material to show a generic name on the disk jacket 16, as well as expose the insert 38.

Figure 9:
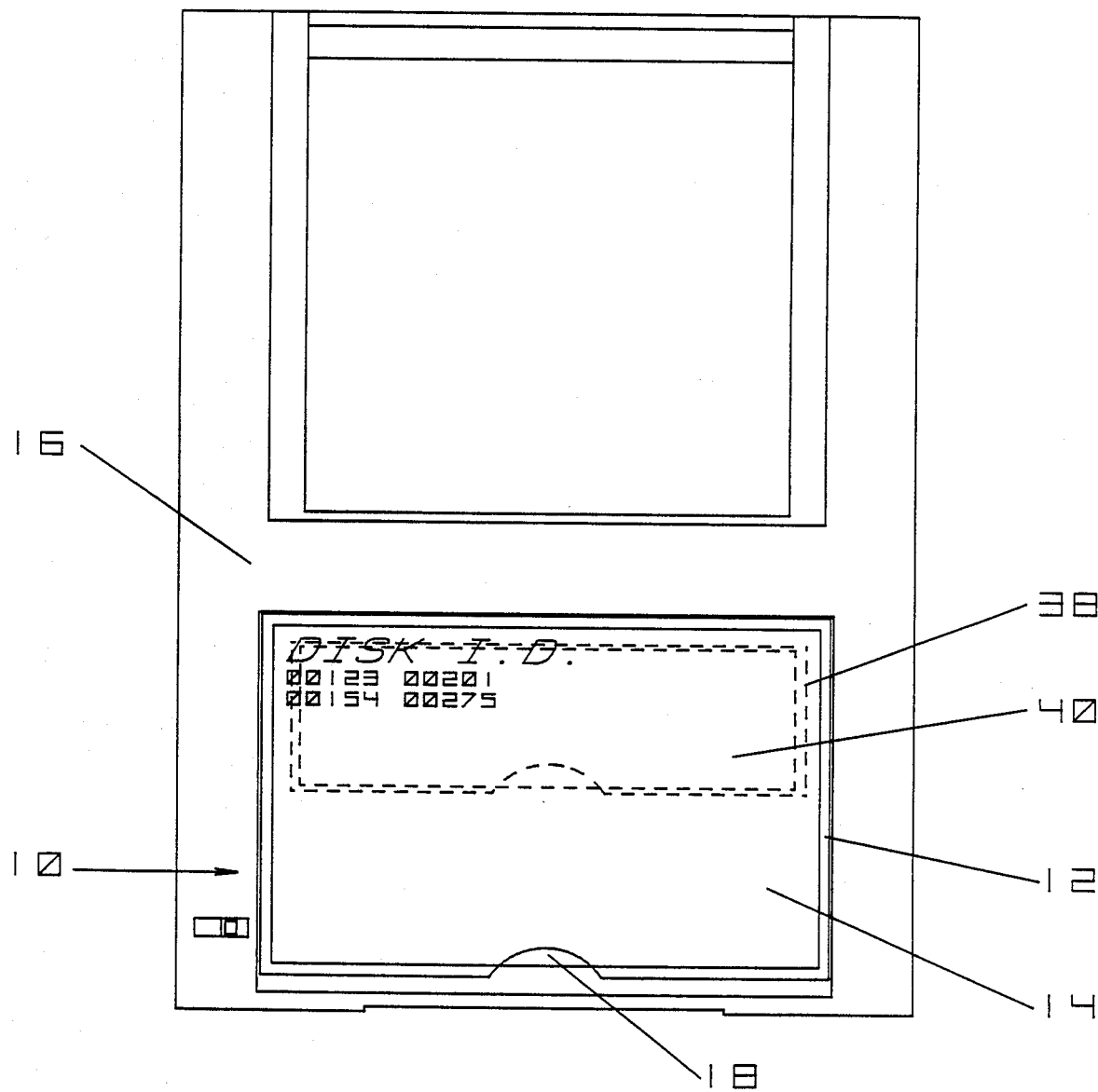
FIG. 9 illustrate the window and insert of applicant's invention attached to a Bernoulli disk.

FIG. 9 illustrates the embodiment of applicant's invention shown in FIG. 4 attached to a large Bernoulli type disk 16. An additional window 38 is attached on top of the window 12 to hold a complete index insert 40.

Although this specification has made reference to the illustrated embodiments, it is not intended to restrict the scope of the appended claims. The claims themselves contain those restrictions deemed essential for the invention.

I claim:

1. A method for indexing and labeling one or more electronic disks for use in a disk drive of a data processing system having electronically activated storage media covered by an outer jacket surface with a segment on the non-electronic readable portions of said outer jacket surface sized to accommodate a removable label, and with a window opening in the face of the electronic disk jacket in communication with the segment to expose a label, said method comprising the steps of:
   a. adapting a segment of the outer jacket of each electronic disk, which will not interfere with the electronic reading of the storage media, with window structure to accommodate a removable label;
   b. reading names of files stored on each electronic disk;
   c. storing the names of files into a data structure;
   d. sorting the names of files from said data structure by desired criteria;
   e. printing an index of names for each disk on a removable label insert which is sized to fit within said window; and
   f. inserting the removable label insert into an appropriate window.

2. A method according to claim 1, wherein the window comprises a transparent film window pane sized to fit within and cover a desired segment of the outer jacket, having an adhesive strip coating along desired segments of the interior perimeter edges on one side of the transparent film window pane to bond the window to the disk and leave an opening through which the label may be inserted.

3. A method according to claims 1, or 2, wherein the labels and window panes are rectangular.

4. A method according to claims 1, 2, or 3, wherein the window panes and labels are colored and patterned to aid a user in storing the electronic disks in a desired sequence.

5. A method according to claim 1, wherein the computer disk has an edge which defines;
   a. a longitudinal slot along one edge of the non-electronic readable portions of the outer disk jacket, said slot sized to accommodate a removable label, and
   b. a window opening in the face of the electronic disk jacket in communication with the slot to expose the label.

6. A method according to claim 1 wherein the window comprises:
   a. a storage envelope pouch with an opening sized to accommodate and protect an electronic disk when removably inserted through the opening,
   b. a transparent pocket attached to the envelope with an opening proximate the storage envelope opening, said pocket sized to removably secure a removable label when inserted in the pocket.

7. A method according to claim 6, wherein the window is constructed of a transparent material.

* * * * *